United States Patent [19]
Berghauser et al.

[11] Patent Number: 5,643,387
[45] Date of Patent: Jul. 1, 1997

[54] INSTANT COLOR SUBLIMATION TRANSFERS

[76] Inventors: Donald C. Berghauser; Sally H. Berghauser, both of 4664 S. Union St., Morrison, Colo. 80465

[21] Appl. No.: 110,647

[22] Filed: Aug. 9, 1993

Related U.S. Application Data

[63] Continuation of Ser. No. 891,919, Jun. 1, 1992, abandoned, which is a continuation of Ser. No. 645,320, Jan. 24, 1991, abandoned, which is a continuation of Ser. No. 240,507, Sep. 6, 1988, abandoned.

[51] Int. Cl.$^6$ .................................................. B32B 31/00
[52] U.S. Cl. ........................... 156/230; 156/235; 156/240; 8/471
[58] Field of Search ............................. 156/230, 235, 156/240; 8/471

[56] References Cited

U.S. PATENT DOCUMENTS

| | | | |
|---|---|---|---|
| Re. 27,892 | 1/1974 | Blake | 101/470 |
| 1,274,206 | 7/1918 | Shuman et al. | |
| 2,571,962 | 10/1951 | Smith et al. | 154/97.5 |
| 2,647,337 | 8/1953 | Martin | 41/1 |
| 2,684,775 | 7/1954 | Von Hofe | 216/21 |
| 2,721,821 | 10/1955 | Hoover | 154/95 |
| 2,920,009 | 1/1960 | Humphner | 154/95 |
| 3,130,107 | 4/1964 | Shank, Jr. | 156/559 |
| 3,255,476 | 6/1966 | Dawson | 12/52 |
| 3,289,573 | 12/1966 | Apicella | 101/27 |
| 3,347,733 | 10/1967 | Elver | 156/515 |
| 3,359,127 | 12/1967 | Meyer et al. | 117/3.4 |
| 3,363,557 | 1/1968 | Blake | 8/471 |
| 3,403,045 | 9/1968 | Erickson et al. | 117/68 |
| 3,418,926 | 12/1968 | Hakogi | 101/35 |
| 3,502,495 | 3/1970 | Akamatsu | 117/38 |
| 3,574,049 | 4/1971 | Sander | 161/220 |
| 3,580,795 | 5/1971 | Eichenlaub | 156/583 |
| 3,620,881 | 11/1971 | Kanneglasser et al. | 156/583 |
| 3,640,213 | 2/1972 | Schwartzbach | 101/8 |
| 3,647,503 | 3/1972 | Mizutani et al. | 117/36.4 |
| 3,725,575 | 4/1973 | Dell | 178/6.7 R |
| 3,782,896 | 1/1974 | Defago et al. | 8/2.5 |
| 3,786,182 | 1/1974 | Kaneko et al. | 178/6.7 A |
| 3,788,106 | 1/1974 | True | 68/5 D |
| 3,792,968 | 2/1974 | Rickenbacher et al. | 8/2.5 |
| 3,816,221 | 6/1974 | Shank, Jr. | 156/492 |
| 3,818,823 | 6/1974 | Bond | 100/93 P |
| 3,829,286 | 8/1974 | Funabashi et al. | 8/2.5 |
| 3,868,214 | 2/1975 | Shackleton | 8/2.5 |
| 3,938,164 | 2/1976 | Ohnishi et al. | 346/110 R |
| 3,860,388 | 1/1975 | Haigh | 8/2.5 |

(List continued on next page.)

FOREIGN PATENT DOCUMENTS 57-102390   6/1982   Japan.

OTHER PUBLICATIONS

Kodak SU6500 Color Video Printer User's Manual, 1987.
C.E. Vellins in Venkataraman's "The Chemistry of Synthetic Dyes," vol. VIII, (Academic Press), 1978, pp. 191–192, 200–201.
C.E. Vellins in Venkataraman's "The Chemistry of Synthetic Dyes," (Academic Press, 1978), pp. 191–194, 200–202 and 212–214.

*Primary Examiner*—James Engel
*Attorney, Agent, or Firm*—Penrose Lucas Albright

[57] ABSTRACT

A method of applying the images in prints, produced by a color image thermal printer, on ceramic mugs, tiles, and metal objects having a coatings which absorbs the sublimable dyes employed, and on fabrics with a polyester content of 50% or higher. The method employs a heat press to transfer the sublimable dyes of the image produced on conventional color video printer print paper into a plastic surface coating applied to ceramic mugs, tiles, or metal articles or the polyester components of fabrics. The limited quantities of sublimable dyes contained in the print originally designed to be an end product produce a sharp, clearly defined transfer of the images from the electronic print paper when heated to between 350°–450° F. while being tightly and continuously pressed against the transfer surface by a relatively high pressure for a period of three to six minutes.

20 Claims, 2 Drawing Sheets

U.S. PATENT DOCUMENTS

| | | |
|---|---|---|
| 3,952,131 | 4/1976 | Sideman ............................ 8/468 |
| 3,969,071 | 7/1976 | Hugelin . |
| 3,974,014 | 8/1976 | Meisner et al. ..................... 156/240 |
| 4,021,591 | 5/1977 | DeVries et al. ................ 156/240 X |
| 4,058,644 | 11/1977 | DeVries et al. . |
| 4,086,112 | 4/1978 | Porter ............................. 156/73.1 |
| 4,119,398 | 10/1978 | Purser ............................... 8/2.5 R |
| 4,132,833 | 1/1979 | Sandhu ............................. 428/481 |
| 4,171,230 | 10/1979 | Bolliger et al. ................... 8/2.5 A |
| 4,174,250 | 11/1979 | Durand ................................ 8/471 |
| 4,177,299 | 12/1979 | Severus et al. .................... 8/471 |
| 4,201,821 | 5/1980 | Fromson et al. .................... 8/444 |
| 4,202,290 | 5/1980 | Hatfield ............................ 118/211 |
| 4,205,991 | 6/1980 | Becker et al. . |
| 4,207,069 | 6/1980 | Ono .................................... 8/471 |
| 4,231,743 | 11/1980 | Buckwalter et al. ................ 8/471 |
| 4,242,092 | 12/1980 | Glover ................................ 8/472 |
| 4,250,831 | 2/1981 | McMillin et al. . |
| 4,264,394 | 4/1981 | Izumihara ......................... 156/358 |
| 4,273,552 | 6/1981 | Nischwitz . |
| 4,278,434 | 7/1981 | Krock et al. . |
| 4,284,410 | 8/1981 | Nischwitz et al. ................. 8/471 |
| 4,294,641 | 10/1981 | Reed et al. ....................... 156/234 |
| 4,323,601 | 4/1982 | McMillin et al. ................. 427/287 |
| 4,352,721 | 10/1982 | Park et al. ..................... 204/35 N |
| 4,354,851 | 10/1982 | Hix et al. ........................... 8/471 |
| 4,367,071 | 1/1983 | Mizuno et al. ...................... 8/471 |
| 4,395,263 | 7/1983 | Davis ................................. 8/471 |
| 4,411,667 | 10/1983 | Meredith et al. .................... 8/471 |
| 4,455,934 | 6/1984 | Van Der Roer ..................... 101/35 |
| 4,462,852 | 7/1984 | Custor ............................... 156/231 |
| 4,465,489 | 8/1984 | Jenkins et al. ...................... 8/471 |
| 4,465,728 | 8/1984 | Haigh et al. ........................ 8/471 |
| 4,475,458 | 10/1984 | Kennell et al. ................ 101/382 MV |
| 4,496,955 | 1/1985 | Maeyama et al. ................ 346/76 PH |
| 4,505,975 | 3/1985 | Majima ............................ 428/336 |
| 4,514,815 | 4/1985 | Anderson ......................... 364/478 |
| 4,522,881 | 6/1985 | Kobayashi et al. ............... 428/336 |
| 4,541,340 | 9/1985 | Peart et al. ....................... 101/470 |
| 4,541,830 | 9/1985 | Hotta et al. . |
| 4,564,406 | 1/1986 | Binks . |
| 4,576,610 | 3/1986 | Donenfeld ......................... 8/471 |
| 4,591,360 | 5/1986 | Jenkins et al. ...................... 8/471 |
| 4,621,271 | 11/1986 | Brownstein . |
| 4,628,811 | 12/1986 | Lozen .............................. 101/38 R |
| 4,645,705 | 2/1987 | Abbott, Jr. . |
| 4,650,494 | 3/1987 | Kutsukake et al. ................. 8/471 |
| 4,662,966 | 5/1987 | Sumi et al. ......................... 8/471 |
| 4,664,672 | 5/1987 | Krajec et al. ...................... 8/472 |
| 4,666,320 | 5/1987 | Kobayashi et al. ............... 400/241.1 |
| 4,716,145 | 12/1987 | Vanier . |
| 4,726,675 | 2/1988 | Shiota et al. ...................... 354/75 |
| 4,731,091 | 3/1988 | Majima .............................. 8/471 |
| 4,736,250 | 4/1988 | Blazo .............................. 358/160 |
| 4,738,526 | 4/1988 | Larish ............................. 354/412 |
| 4,758,952 | 7/1988 | Harris et al. ........................ 8/471 |
| 4,820,310 | 4/1989 | Fukui ................................ 8/456 |
| 4,835,563 | 5/1989 | Larish ............................... 354/75 |
| 4,874,454 | 10/1989 | Talalay et al. ................... 156/240 |
| 4,923,848 | 5/1990 | Akada et al. . |
| 4,943,684 | 7/1990 | Kramer .............................. 8/471 |

INSTANT COLOR SUBLIMATION TRANSFERS

RELATED APPLICATIONS

This is a Continuation of application Ser. No. 07/891,919, now abandoned, filed Jun. 1, 1992, which is a Continuation of application Ser. No. 07/645,320, now abandoned, filed Jan. 24, 1991, which is a Continuation of application Ser. No. 07/240,507, now abandoned, filed Sep. 6, 1988.

BACKGROUND OF THE INVENTION

1. Field of Invention

The present invention relates in general to sublimation transfers and in particular to a method of using prints produced by color video print systems as sublimation transfers in decorating ceramic mugs and other surfaces such as coated ceramic tiles and metal objects.

2. Prior Art

The capability of printing photographic-like images on hard surfaces such as ceramic mugs and tiles fulfills an ongoing need as exemplified by the number of decorated mugs and tiles which we sold and are available for sale in a broad range of retail stores. Current methods of producing these items is to pre-print transfers as decals by one of the following methods, silk screen printing, offset printing, gravure printing or mimeograph wherein the inks employed in these processes contain sublimable dyes. These methods require color separation and long production runs. Another process uses transfers produced on a xerographic type copy machine and these transfers can only be produced as a single color or black on white. These systems are not capable of producing single, full color transfers economically and quickly. Currently, other than by the process disclosed herein, the only partical method for producing ceramic mugs which have full color decorations and each is unique is by hand painting individual pieces.

SUMMARY OF THE INVENTION

The principal object of the present invention is to provide a method to economically and quickly make one-of-a-kind products using a full color sublimation transfer process. More specifically, it is a further object of this invention to provide such a method to create one-of-a-kind ceramic mugs by transfer print images.

The foregoing objects can be accomplished by using a color video thermal printing device. The images contained in prints made by using these printers, as disclosed in U.S. Pat. No. 4,650,494 of Kutsukake et al issued Mar. 17, 1987 and U.S. Pat. No. 4,731,091, of Majima issued Mar. 15, 1988, are transferred to surfaces, coated with a special coating, by applying heat and pressure, as required. For mugs, the images are applied to the mug using a special conforming mug heat press.

The invention is illustrated preferred embodiments in the accompanying drawings.

DETAILED DESCRIPTION

Figure 1:
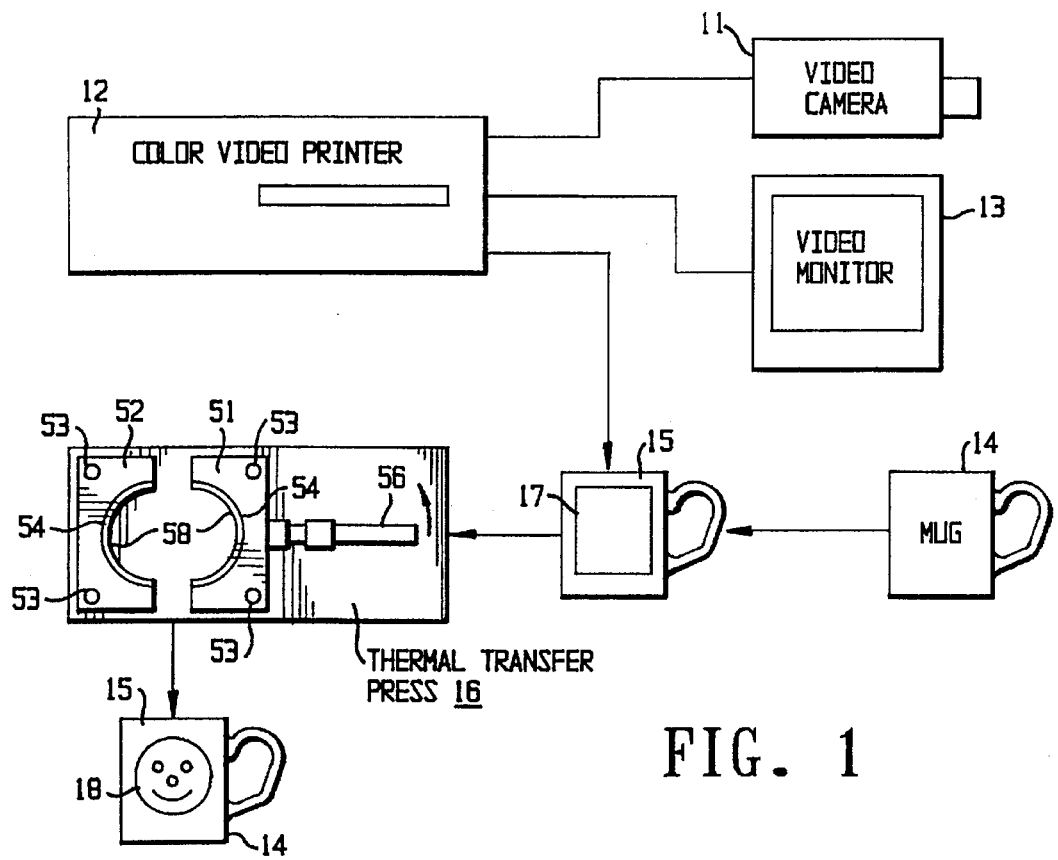
FIG. 1 is a schematic of the instant color sublimation transfer process in accordance with the present invention.

Referring now to FIG. 1, a schematic drawing of a preferred embodiment of this invention is disclosed wherein a color video print is transferred to a coffee mug. This invention thus involves a new use for prints made using a color video printing system. A description for producing such prints is found in U.S. Pat. No. 4,731,091 of Osamu Majima which issued Mar. 15, 1988. The invention comprises a secondary sublimable dye thermal transfer printing process and device. Color video printers were developed to produce high resolution prints in full color of anything that can be viewed on the screen of a TV by freezing the motion and recording the event. By means of the color video system, prints of images received by camera 11 can be reproduced for future reference. The instant invention teaches a novel use of such prints produced by the color video system. However, to be used in the process, it is important that the system have the capability to produce a print which is a mirror image of that seen by camera 11. Normally, therefore a video printer 12, such as the Hitachi Color Video Printer VY-55A, should be provided with a logic chip, circuit, or other device to convert the camera image to a mirror image. Finally, the color video system should include a monitor 13 to view the composition. The print produced by the color video system can then be transferred to a specially coated ceramic mug. Appropriate coating materials are known in the art such as those, for examples, disclosed by Davis, U.S. Pat. No. 4,395,263 of Jul. 26, 1983 a hydrophobic synthetic polymer, for example, phenolformaldehyde resins, polyamide resins, such as nylon and polymers obtained from dimerized fatty acids, unsaturated polyesters, cellulose acetate, polyether resins, such as epoxy resins, phenoxy resins, polysulfide resins, polydimethysiloxane amino resins, such as melamine-formaldehyde resin; alkyd resin; heterocyclic polymers, such as polyamide resins, polyacrylate resins, such as polymethyl methacrylate, cyclohexyl methacrylate and polymethyl-2-cyanoacrylate; polyacrylonitrile resins, acrylimitrile-butadiene resins, polystyrene resins, copolymers of dicyanoethylene and vinyl acetate; and polyvinyl resins, such as polyvinyl chloride, polyvinyl acetate, polyvinyl alcohol, polyvinyl acetals, polyvinyl pyridine, and also the polymers referred to in Defago U.S. Pat. No. 3,782,896, Hix et al, U.S. Pat. No. 4,354,851 of Oct. 19, 1982, e.g. acrylic glass including homopolymers of methymetracrylate as well as copolymers consisting for the most part of this monomer, preferably at least 70% and the remainder of other monomers that can be copolymerized with it, inclusive of acrylonitriale-methylmethacrylate copolymers, polyethylene, polypropylene, polyvinylchloride, polystryrene, and impact-resistant butadiene-styrene plastics, polyoxynethylene polycarbonate, fiber glass-reinforced polyester, and aminoplast synthetics, and Krajec, U.S. Pat. No. 4,664,672 of May 12, 1987 e.g. clear, polymeric coatings selected from alkyd-melamine resins, polyester resins, alkyd resins and acrylic polymers. The print 17 produced by the color video printing system is placed against surface 15 of a ceramic mug 14 which has been so coated and the combination is placed in a thermal transfer press 16. The thermal transfer press applies a high pressure, something more than the nominal pressures used by those skilled in the art of printing thermal transfers, but not, of course, so much that mug 14 is broken, and a temperature of 350°–450° F. is applied for a period of three to six minutes. Print dyes of print 17 are thereby transferred into coating 18 of mug 14. Because the amount of sublimable dyes transferred in the color video printing system to the electronic print paper and thus, and available for transfer therefrom, are limited, perfect contact between print 17 and surface 15 of mug 14 should be maintained to produce a commercially acceptable transfer onto mug 14.

Figure 3:
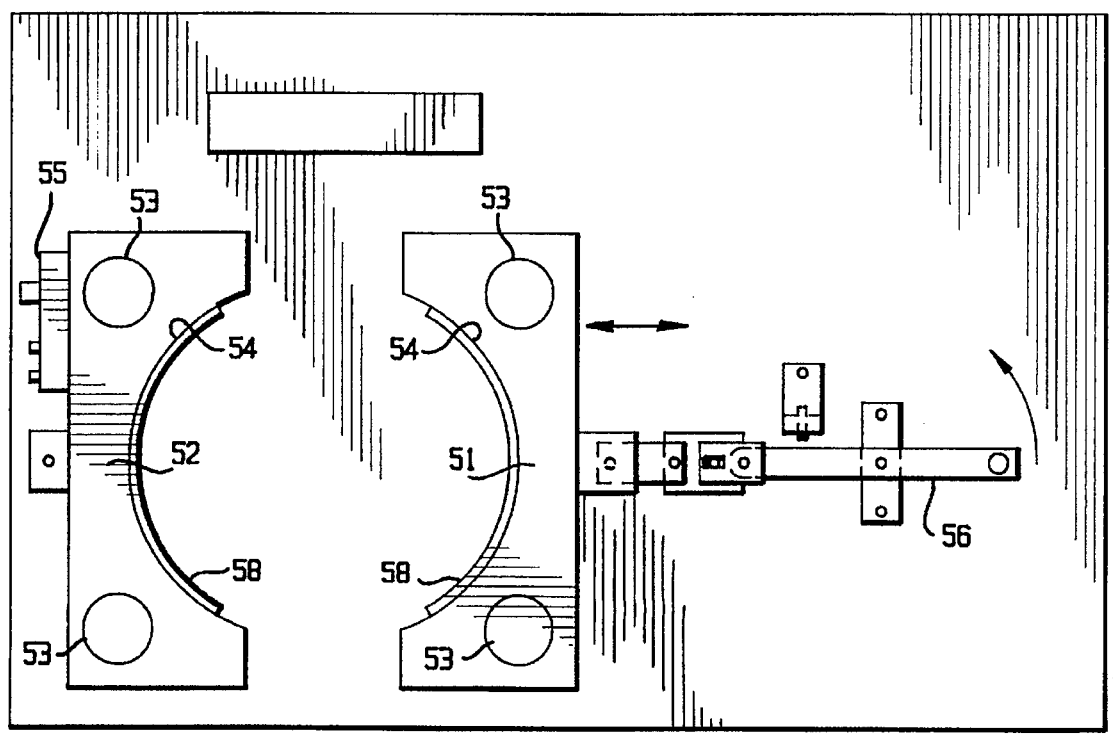
FIG. 3 is a plan view of a mug heat transfer press.

A special mug heat press, as shown in FIG. 3, comprises two metal platens 51 and 52 heated by electric resistance heaters 53, each platen having two electric resistance heaters 53 therein. The metal platens 51 and 52 must have a radius as near identical to the radius of the outside dimension of the mug as possible. The metal platen inner surface 54 has a silicone rubber gasket 58 to ensure a tight contact between print 17 and mug surface 15. The gaskets 58 accommodate the slightly irregular surfaces of the mugs. A mechanical or hydraulic closing device 56 is used for opening and closing platen 51 and applying the pressure. The temperature of the platens 51 and 52, produced by electric resistance heaters 53, is controlled by an adjustable thermostat 55.

Figure 2:
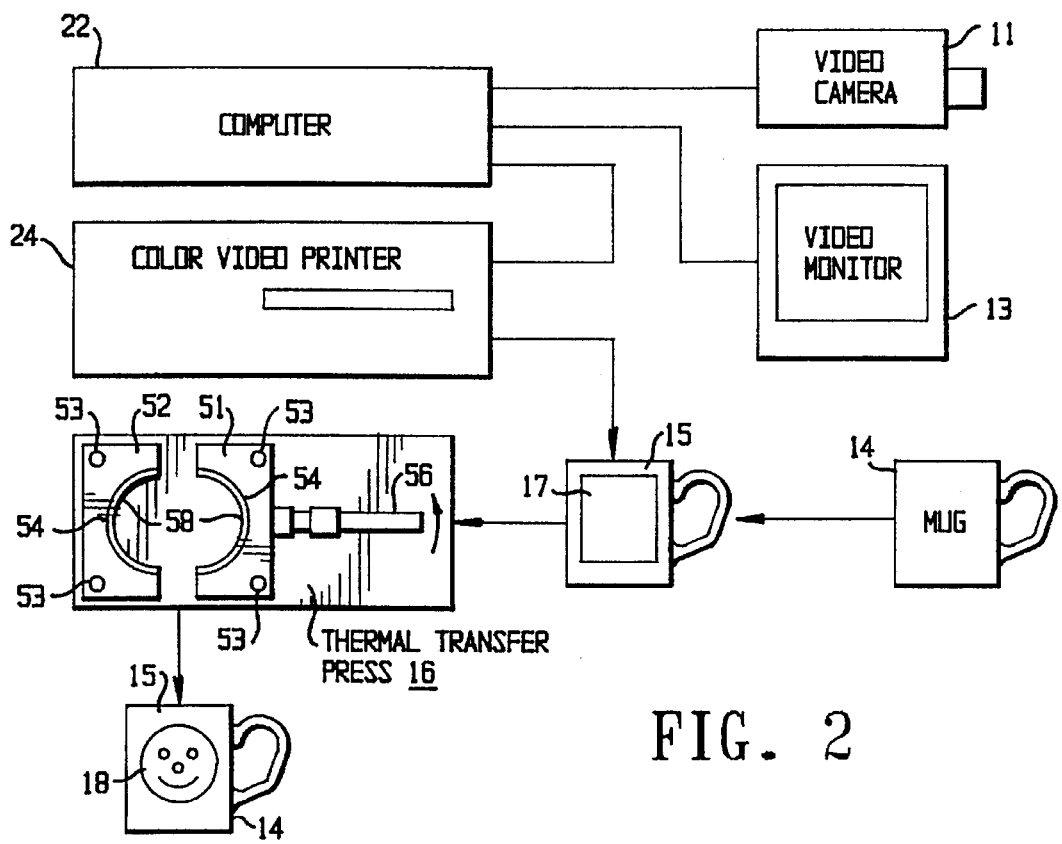
FIG. 2 is a schematic of the instant color sublimation transfer process incorporating a graphics computer in accordance with the present invention.

As indicated, the prints used in the thermal printing process are produced by a color video printing system. The source of the signal provided to color video printer 12 is video camera 11 as seen in FIG. 1. The video signal may be sent directly to color video printer 12 if it is provided with a capability or function, as in the Hitachi VY-55A, to convert the video image to a mirror image. Otherwise, the video image can be routed to a computer 22 with a graphics program which allows it to convert the video image to a mirror image and transmit the recorded data to the color video printer 24 as shown in FIG. 2.

Prints made from the color video system can also be printed onto a flat surface of specially treated (coated) ceramic tiles and metal objects using the inventive process. These prints can also be transferred, or printed, on fabrics which contain at least 50% polyester if the time, temperature and pressure conditions of the process as disclosed above are followed. In all cases it is important to have the temperature in the 350°–450° F. range and to apply a relatively high pressure. Most flat heat presses which can produce the high pressure and temperature, can be used successfully in applying the transfer to flat surfaces.

The foregoing description of the preferred embodiment of this invention has been presented for the purpose of illustration and description. It is not intended to be exhaustive or to limit the invention to the precise form disclosed. Many modifications and variations are possible in light of the above technique. It is intended that the scope of the invention be limited not by this detailed description but rather by claims appended hereto.

What we claim as new to be secured by Letters Patent in the United States is:

1. A process for use in combination with a color video printer of transferring a print of an image, formed substantially entirely of sublimable dyes produced by said printer in an initial step of the process by sublimation transfer of said dyes onto color video printer print paper, to a surface capable of receiving and retaining sublimable dyes, which process comprises the further steps of:

placing said print produced by sublimation transfer of sublimable dyes directly against said surface; and heating and pressing said print at a temperature above 300° F. and with sufficient force directly against said surface so that said sublimable dyes forming said image on said print are sublimated and transferred permanently from said print directly to said surface without distortion of said image transferred thereto.

2. A process as claimed in claim 1, wherein said pressing step comprises applying a high pressure to the back of said color video printer print paper and thereby forcing said print against said surface concurrent with said heating step.

3. A process as claimed in claim 2, wherein said surface comprises a finish on the exterior of a ceramic mug capable of receiving and retaining sublimable dyes.

4. A process as claimed in claim 2, wherein said surface comprises a finish on a ceramic tile capable of receiving and retaining sublimable dyes.

5. A process as claimed in claim 2, wherein said surface comprises the side of a piece of a fabric having a polyester content of at least 50% which is placed in juxtaposition with said print paper during said heating and pressing steps.

6. A process as claimed in claim 1, further comprising the initial step of creating a mirror image print of whatever is imaged by a color video system which includes said color video printer.

7. A method of placing colored images on surfaces composed of a material that accepts sublimable dyes comprising the steps of:

creating a video image on the monitor of a standard color video print system;

producing a print of said image by the sublimation transfer of sublimable dyes to a color video printer print paper using a color video thermal printer of said system;

placing the front said print in contact with said surface to which said image is to be transferred;

applying sufficient force to the back of said print to obtain complete pressurized contact between said print and said surface; and heating said print so that said sublimable dyes therein are sublimated and received by said surface to transfer said image into the material of which said surface is composed without undue distortion, said transferred image being permanently received by said material and resistant to deterioration by light and wear, said heating step being conducted at a temperature in the range of 350° F. to 450° F.

8. A method as claimed in claim 7, further comprising a first step of coating a solid substrate to provide a layer on said substrate which comprises said surface, said layer composed of a material that is receptive to said sublimable dyes.

9. A method as claimed in claim 7, wherein said surface comprises the side of a piece of a fabric containing at least 50% polyester, said side being in contact with the front of said print when force is applied to the back of said print.

10. A method as claimed in claim 7, wherein said heating step has a duration of three to six minutes.

11. A method as claimed in claim 7, wherein between said steps of creating a video image and producing said print there is an additional step of creating a mirror image of said video image.

12. A process for the sublimation transfer of images formed by sublimation dyes on a receptive objective body, said process comprising a first step of sublimation transferring an image formed from a plurality of sublimable dyes to a receptive sheetlike material, and a second step of sublimation transferring said image from said receptive sheetlike material to said objective body, said second step including heating said dyes in said receptive sheetlike material to a temperature of about 350° F.–450° F. as sufficient to sublimate said dyes and simultaneously pressing said sheetlike material against said receptive objective body so that said sublimable dyes in said sheetlike material are sublimated from a solid phase to a vapor phase and received by said objective body in a vapor phase where said dyes convert to a solid phase to form a substantially faithful reproduction of said image without substantial distortion thereof.

13. A process in accordance with claim 12, wherein said first step is carried out by means of a thermal printer on the basis of stored image data recorded in a color video printer.

14. A process in accordance with claim 13, wherein said thermal printer comprises a thermal head having a plurality of thermal elements, said thermal elements selectively heating portions of sublimable dye areas in a heat transfer printing sheet sufficiently to sublimate said dyes and to transfer said dyes in the form of said image to said sheetlike material.

15. A process for the sublimation transfer of images formed by sublimation dyes on a receptive objective body, said process comprising a first step of sublimation transferring a multi-color image formed of at least two different colors of sublimable dyes to a receptive sheet-like material, and a second step of sublimation transferring said image from said receptive sheet-like material to said objective body, said second step including heating said dyes in said receptive sheet-like material to about 350° F.–450° F. as sufficient to sublimate said dyes and simultaneously pressing said sheet-like material against said receptive objective body so that said sublimable dyes in said sheet-like material are received by said objective body to form a substantially faithful reproduction of said image.

16. A process in accordance with claim 15, wherein said objective body comprises a ceramic material which has been coated with a substance that is receptive to receiving said sublimable dyes.

17. A process in accordance with claim 15, wherein the surface of said receptive objective body that receives said image is curved.

18. A process in accordance with claim 17, wherein said receptive objective body comprises a mug.

19. A process in accordance with claim 15, wherein said receptive objective body is composed of cloth.

20. A method of placing multiple color images on surfaces composed of a material that accepts sublimable dyes comprising the steps of:

creating a video image on the monitor of a color video print system;

producing a multiple color print of said image by the sublimation transference of sublimable dyes onto a medium by a color video thermal printer of said system;

placing the front said medium in contact with said surface to which said image is to be transferred;

applying force to the back of said medium to obtain complete pressurized contact between said medium and said surface; and heating said medium to above 300° F. so that said sublimable dyes therein are sublimated and received by said surface to transfer said image into the material of which said surface is composed without undue distortion and so that said transferred image is permanently received by said material and resistant to deterioration by light and wear.

* * * * *